United States Patent [19]

Symietz

[11] Patent Number: 4,507,421

[45] Date of Patent: Mar. 26, 1985

[54] ADHESIVE CONTAINING ZINC POWDER

[75] Inventor: Detlef Symietz, Oberursel, Fed. Rep. of Germany

[73] Assignee: USM Corporation, Farmington, Conn.

[21] Appl. No.: 572,879

[22] Filed: Jan. 23, 1984

Related U.S. Application Data

[63] Continuation of Ser. No. 360,614, Mar. 22, 1982, abandoned.

[30] Foreign Application Priority Data

Mar. 24, 1981 [GB] United Kingdom ................. 8109152

[51] Int. Cl.³ .......................... C08K 3/26; C08K 3/08; B23K 11/10
[52] U.S. Cl. .................................... 524/425; 524/439; 219/91.2; 156/334
[58] Field of Search ............................... 524/425, 439

[56] References Cited

U.S. PATENT DOCUMENTS

| | | | |
|---|---|---|---|
| 2,452,805 | 11/1948 | Susgenbach | 252/510 |
| 2,506,728 | 5/1950 | McGrath | 252/511 |
| 2,568,188 | 9/1951 | Fisher | 524/439 |
| 2,726,308 | 12/1955 | Cinamon | 428/198 |
| 2,768,993 | 10/1956 | Drummond | 524/439 |
| 3,392,130 | 7/1968 | Rucker et al. | 524/439 |
| 3,687,881 | 8/1972 | Bowman | 524/439 |
| 3,904,555 | 9/1975 | Matsuda et al. | 523/457 |
| 3,984,369 | 10/1976 | Harlan et al. | 524/425 |
| 4,079,163 | 3/1978 | Tanaka et al. | 428/328 |
| 4,092,290 | 5/1978 | Bowser | 524/443 |
| 4,110,117 | 8/1978 | McLeod | 106/14.4 X |
| 4,119,763 | 10/1978 | Blair | 428/328 |
| 4,171,297 | 10/1979 | Hosaka et al. | 524/439 |
| 4,221,696 | 9/1980 | Cook et al. | 524/425 |
| 4,258,100 | 3/1981 | Fujitani et al. | 428/356 |

FOREIGN PATENT DOCUMENTS

| | | | |
|---|---|---|---|
| 165969 | 12/1980 | Japan | 524/439 |
| 3870 | 1/1982 | Japan | 524/439 |

OTHER PUBLICATIONS

Derwent Abst. 08218Y/05, (J51145538), Dec. 14, 1976.
Derwent Abst. 94158D/51, (J56144861), Nov. 11, 1981.
Derwent Abst. 36168E/18, (J57051267), Mar. 26, 1982.

*Primary Examiner*—Herbert J. Lilling
*Attorney, Agent, or Firm*—John P. Morley

[57] ABSTRACT

A novel sealant composition particularly suitable for use in spot welding operations. The novel sealant composition comprises thermoplastic synthetic polymeric material and an amount of finely divided zinc up to about 15 percent by weight of the composition.

8 Claims, No Drawings

ADHESIVE CONTAINING ZINC POWDER

This is a continuation of application Ser. No. 360,614, filed Mar. 22, 1982, now abandoned.

THE FIELD OF THE INVENTION

This invention relates to a new and improved sealant composition, and to methods of spot welding using the sealant composition.

DESCRIPTION OF THE PRIOR ART

It is known, for example, in the automotive industry, to secure steel and other ferrous metal parts together by spot welding processes. It is also known to employ a sealant composition between the welded metal parts which is intended to prevent penetration of moisture between the parts. If the seal is deficient, moisture can penetrate between the welded parts which may lead to corrosion. The onset of corrosion has been observed particularly in the region of the welds. Accordingly, there is a need for a sealant composition which can be used in the spot weld process and which can provide a reduced level of corrosion within the joint.

The use of metallic zinc in compositions for corrosion resistant treatments, such as paints is also known. However, in order to obtain an adequate level of corrosion resistance, sufficient zinc must be employed to insure that the corrosion resistant layer laid down from the composition has a substantial amount of zinc at its surface in order to provide a corrosion resistant effect. Usually amounts in excess of 60% zinc by weight of the composition are used in such corrosion resistant compositing. However, the use of such substantial quantities of zinc in permanently plastic deformable sealant compositions tends to adversely affect the sealing properties of the composition.

BRIEF SUMMARY OF THE INVENTION

The novel, improved sealant compositions of this invention are particularly suitable for use as spot welding sealants. The sealant compositions are based on thermoplastic synthetic polymeric materials and include comparatively small amounts—up to about 15 percent by weight of the composition—of finely divided zinc. The sealant compositions are especially useful in a spot welding process to provide joints which are remarkably less prone to corrosion. The compositions can be applied in the form of a plastic mass to metal parts and provide a deformable seal bonded to the metal parts after the metal parts have been secured together by spot welding with the sealant between them.

DESCRIPTION OF THE PREFERRED EMBODIMENT

The preferred sealant compositions of this invention are thermoplastic compositions substantially free of solvent and may be applied at elevated temperatures e.g., at 100° to 150° C., by means of a pump, or at room temperature as a preformed strip of foil. The preferred compositions are plastic or deformable to some extent under comparatively light pressure at room temperatures of the order of 20°±3° C. and retain this characteristic to a high degree during their working life.

An important performance characteristic of spot welding adhesive composition is that the composition not present safety or other hazards during handling or use. Temperatures reached during spot welding may be of the order of 1000° C. or more and it is important that the sealant composition can be used at such temperatures. For example, the sealant composition must not degrade completely, nor must it flow from the joint to an undesirable extent.

Another desirable performance characteristic is that the sealant composition have adequate tackiness and adhesion characteristics to insure desired permanance of bonding of the composition to the metal parts. Some ability to flow slightly to take up progressive changes in shape of metal parts may also be desirable but it is important that the sealant does not sag significantly or flow out of the joint during normal conditions of use. Additionally, it is important that the sealant composition does not permit transmission of moisture through the joint to a significant extent and accordingly a sealant composition of low moisture vapor transmission rate is highly desirable.

Preferred polymeric materials for the sealant composition of this invention are polybutenes and polyisobutylenes, although other polymeric materials are contemplated, for example, ethylene vinyl acetate copolymers, polyethylene, atactic polypropylene, butyl rubber and mixtures thereof. These polymeric materials may be compounded with other polymers, e.g. thermoplastic block copolymers, tackifying or other resins, for example, rosin, rosin ester, hydrocarbon resin (e.g. a betapinene or coumarone-indene resin), melamine formaldehyde resins, phenolic resins, terpene resins, an other resins known in the adhesives art. Waxes, extending oils and plasticisers may also be employed in the composition to achieve a sealant composition having a desirable blend of properties in application and use as mentioned above.

Especially preferred compositions are set forth in tabular form below.

| Ingredients | Percent by Weight of Composition | |
|---|---|---|
| | Range | Preferred Range |
| Butyl Rubber | 5–50 | 10–20 |
| Polybutene | 5–50 | 15–30 |
| Polyisobutylene | 0–20 | 4–15 |
| Tackifying Resin | 5–50 | 10–20 |
| Finely Divided Inorganic Filler | 10–50 | 20–35 |

The zinc used is finely divided in order to enable thorough and uniform dispersion throughout the sealant composition, and to facilitate heating of the zinc during spot welding. While particle sizes and their distribution in the zinc do not seem to be especially important, we prefer to use zinc powder having a particle size of about $10^{-3}$ mm. It will be appreciated that a uniform distribution of the zinc throughout the composition is important in order to reproducibly achieve desired corrosion protection.

In carrying out a method according to the invention, metal e.g. mild steel parts intended to be spot welded together are prepared and brought together, with those parts which are to be spot welded together aligned in overlapping relationship. Preparation of the parts is carried out to an appropriate extent in accordance with the condition of the metal. Some oil on the metal is not detrimental, for example, freshly pressed steel sheets for use in manufacture of car bodies normally require no descaling or degreasing. However, corroded or heavily oiled steel may require descaling and/or degreasing prior to spot welding. Following alignment of the parts, a mass of sealant composition is applied to one of the metal parts e.g. as a foil, and the parts are pressed together with the composition between the parts to provide a foil of composition about 0.5 to 1 mm. thick between the parts. The foil is arranged to be of sufficient size to extend up to the exposed edge of the joint and to extend between the metal parts in those areas which are to be spot welded.

The parts are clamped in the desired location, the location for spot welds is marked, and a conventional spot welding device applied to weld the parts together. Each weld is formed through the sealant composition.

We have found that even small amounts of zinc are beneficial in reducing the incidence of corrosion on the steel parts joined by spot welding using a sealant composition according to the invention. Amounts as small as about 1% properly distributed through the sealant mass show a significant effect, amounts of about 5% and about 10% show more significant effects, and it appears unnecessary to employ amounts in excess of about 15% by weight of the composition in order to achieve a highly acceptable level of corrosion resistance.

This is surprising in view of the previous understanding in the art that substantial quantities of zinc are necessary in order to achieve an acceptable level of corrosion resistance. The reason for this surprising result is not fully understood. However, it is possible that during application of heat at the time of spot welding, the organic content of the sealant composition immediately adjacent the point of welding is decomposed or burned away. Possibly zinc metal is vaporized at this time and becomes deposited on the metal immediately adjacent the weld. Perhaps a galvanizing of the metal occurs, or possibly an alloying occurs at the surface of steel parts rendering the metal parts more resistant to corrosion thereafter.

In order that the invention may be more fully appreciated there now follows by way of Example, a detailed description of three illustrative sealant compositions containing different amounts of zinc power, and their use in spot welding of metal parts. It is to be clearly understood that the illustrative compositions and methods have been selected to describe preferred embodiments of the invention and are not limitative of the invention.

EXAMPLE

The Example compositions comprised an intimate mixture of thermoplastic synthetic polymeric material, fillers, extender oil and rosin together with varying amount of zinc powder. A masterbatch composition was made up comprising the following materials.

| Ingredients | Parts by Weight |
| --- | --- |
| Polybutene | 25 |
| Polyisobutylene | 5 |
| Butyl Rubber | 15 |

| Ingredients | Parts by Weight |
| --- | --- |
| Finely Divided $CaCo_3$ | 30 |
| Extender Oil | 4 |
| Rosin | 15 |
| Block Copolymer (A-B-A Type) | 5 |
| Pigment | 0.5 |
| Antioxidant | 0.5 |

A comparative Example sealant composition (Composition 0, Table 1) consisted of a portion of the masterbatch composition. Illustrative sealant compositions (Compositions 1, 2 and 3, Table 1) comprised portions of the masterbatch composition, and a further 1, 5 and 10 parts by weight respectively of finely divided zinc powder per hundred parts by weight of the masterbatch composition. Accordingly, illustrative sealant compositions 1, 2 and 3 of Table 1 comprised 1, 4.8 and 9 percent by weight of finely divided zinc respectively.

Four sets of test samples were prepared as follows. Sheets of each sealant composition (0, 1, 2 and 3) approximately 0.5 to 1 mm. thick were placed between pairs of sheets of steel 25 mm. by 25 mm. which had been degreased and descaled prior to application of the sealant. The metal plates were pressed together with the sealant between them. A center punch was used to mark the location of spot welds on the plates. Spot welds were formed at the marks by the method described above. After cooling in a flow of nitrogen, excess sealant was removed from the plates.

The samples were aged at 60° C. and 95% humidity. The bond strength of the welded joints was determined by a tensile shear test and the progress of corrosion within the joint was assessed by observation at time intervals of 1 week, 1 month, 4 months and 8 months. The results are shown in Table 1.

From Table 1 it can be seen that the samples including the illustrative composition 3 shown considerably less evidence of corrosion than those samples which included comparative composition 0 particularly at the 4 and 8 month determinations. Those samples including illustrative compositions 2 and 3 also show an improved corrosion resistance as compared with those containing no zinc.

From an inspection of the values for bond strength given in Table 1 it can be seen that the bond strength also is influenced by the zinc content of the composition.

For samples aged for one week or one month, the bond strengths achieved are substantially of the same order. However, for samples aged for four or eight months, in line with corrosion results, the order of values for the bond strengths for samples including comparative composition 0 are less, by a factor of about two times than those for samples including illustrative composition 3. With samples aged four or eight months, the samples including illustrative compositions 1 and 2 also tend to show a higher bond strength than the samples including comparative composition 0.

TABLE I

| Aging Time at 60° C./95% Humidity | Composition | Bonding Strength (Newton) | Number of Samples Tested | Corrosion Assessment (No. of Samples Showing Assessed Corrosion) | | | |
| --- | --- | --- | --- | --- | --- | --- | --- |
| | | | | None | Slight | Distinct | Intense |
| 1 week | 0 | 7500 | 5 | 1 | 3 | 1 | 0 |
| | 1 | 7300 | 5 | 4 | 1 | 0 | 0 |
| | 2 | 8300 | 5 | 2 | 1 | 2 | 0 |
| | 3 | 6700 | 5 | 3 | 2 | 0 | 0 |
| 1 month | 0 | 8100 | 5 | 1 | 3 | 1 | 0 |

TABLE I-continued

| Aging Time at 60° C./95% Humidity | Composition | Bonding Strength (Newton) | Number of Samples Tested | Corrosion Assessment (No. of Samples Showing Assessed Corrosion) | | | |
|---|---|---|---|---|---|---|---|
| | | | | None | Slight | Distinct | Intense |
| 4 months | 1 | 9400 | 5 | 4 | 1 | 0 | 0 |
| | 2 | 8100 | 5 | 2 | 1 | 2 | 0 |
| | 3 | 7800 | 5 | 3 | 2 | 0 | 0 |
| | 0 | 5900 | 1 | 0 | 0 | 0 | 1 |
| | 1 | 8600 | 2 | 0 | 2 | 0 | 0 |
| | 2 | 8200 | 2 | 2 | 0 | 0 | 0 |
| | 3 | 10200 | 2 | 1 | 1 | 0 | 0 |
| 8 months | 0 | 5400 | 2 | 0 | 0 | 1 | 1 |
| | 1 | 7500 | 5 | 3 | 1 | 1 | 0 |
| | 2 | 8700 | 3 | 2 | 0 | 1 | 0 |
| | 3 | 9100 | 3 | 2 | 1 | 0 | 0 |

I claim:

1. A spot welding sealant composition which is plastic at room temperature and consisting essentially of thermoplastic synthetic polymeric material and finely divided metallic zinc in an amount from about 0.5 up to about 15 percent by weight and where the sealant composition can be applied in the form of a plastic mass to metal parts to provide a deformable seal bonded to the metal parts after the metal parts have been secured together by spot welding.

2. A sealant composition of claim 1 where the amount of zinc powder is about 1 or about 5 or about 10 percent by weight of the composition.

3. A spot welding sealant composition which is plastic at room temperature and which comprises from about 0.5 to about 15 percent by weight of the composition of finely divided metallic zinc powder, from about 5 to about 50 percent by weight of butyl rubber, from about 5 to about 50 percent by weight of polybutene, from 0 to about 20 percent by weight of polyisobutylene, from about 5 to about 50 percent by weight of a tackifying resin and from about 10 to about 50 percent by weight of a finely divided inorganic filler.

4. A sealant composition of claim 3 which comprises from about 10 to about 20 percent by weight of butyl rubber, from about 15 to about 30 percent by weight of polybutene, from about 4 to about 15 percent by weight of polyisobutylene, from about 10 to about 20 percent by weight of tackifying resin and from about 20 to about 35 percent by weight of a finely divided inorganic filler.

5. A sealant composition of claim 3 wherein the amount of zinc is about 1 percent by weight of the composition.

6. A sealant composition of claim 3 where the amount of zinc is about 5 percent by weight of the composition.

7. A sealant composition of claim 3 where the amount of zinc is about 10 percent by weight of the composition.

8. A sealant composition of claim 3 where the finely divided inorganic filler comprises calcium carbonate.

* * * * *